US012669391B2

(12) United States Patent
Oguchi et al.

(10) Patent No.: US 12,669,391 B2
(45) Date of Patent: Jun. 30, 2026

(54) LOAD DETECTION DEVICE AND LOAD DETECTION SYSTEM HAVING GUIDE PLATE PROVIDED WITH SLOPE AND HANDLE

(71) Applicant: MINEBEA MITSUMI Inc., Nagano (JP)

(72) Inventors: Shinya Oguchi, Chofu (JP); Manabu Tanaka, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 359 days.

(21) Appl. No.: 18/251,122

(22) PCT Filed: Oct. 28, 2021

(86) PCT No.: PCT/JP2021/039732
§ 371 (c)(1),
(2) Date: Aug. 16, 2023

(87) PCT Pub. No.: WO2022/097556
PCT Pub. Date: May 12, 2022

(65) Prior Publication Data
US 2024/0369428 A1     Nov. 7, 2024

(30) Foreign Application Priority Data
Nov. 4, 2020    (JP) ................................. 2020-184259

(51) Int. Cl.
*G01L 1/22*        (2006.01)
*A61G 7/05*        (2006.01)
(52) U.S. Cl.
CPC .......... *G01L 1/2287* (2013.01); *A61G 7/0527* (2016.11)

(58) Field of Classification Search
None
See application file for complete search history.

(56) References Cited

U.S. PATENT DOCUMENTS 7,763,813 B2 * 7/2010 Domel ................... G01G 19/44
                                                                 177/238
11,480,483 B2 * 10/2022 Tanaka ...................... G01L 1/22
(Continued)

FOREIGN PATENT DOCUMENTS

JP        56-167224 U      5/1981
JP        H11-223546 A     8/1999
(Continued)

OTHER PUBLICATIONS

International Search Report for corresponding International Application No. PCT/JP2021/039732 mailed Dec. 14, 2021.
(Continued)

*Primary Examiner* — Peter J Macchiarolo
*Assistant Examiner* — Jermaine L Jenkins
(74) *Attorney, Agent, or Firm* — Chrisman Gallo Tochtrop LLC

(57)        ABSTRACT
A load detection device (100, 200) installed under a caster of a bed includes a placement unit (30, 230), the caster being placed on the placement unit, a load detection unit (10, 20) configured to detect a load applied to the placement unit, and a guide plate (40) having an annular shape and surrounding the placement unit. The guide plate is provided with a slope (SL) configured to guide the caster to the placement unit and a handle (HD) for moving the load detection device. The slope includes a first slope provided adjacent to the placement unit in a predetermined direction and a second slope provided adjacent to the placement unit in a direction orthogonal to the predetermined direction.

10 Claims, 12 Drawing Sheets

(56)                     References Cited

U.S. PATENT DOCUMENTS

| 2020/0107753 | A1 | 4/2020 | Young et al. |
| 2021/0239547 | A1 | 8/2021 | Tanaka |

FOREIGN PATENT DOCUMENTS

| JP | 2008-065700 | A | 3/2008 |
| JP | 2011-056152 | A | 3/2011 |
| JP | 5143946 | B2 | 2/2013 |
| JP | 2019-200148 | A | 11/2019 |
| WO | 2019/221018 | A1 | 11/2019 |

OTHER PUBLICATIONS

Written Opinion for corresponding International Application No. PCT/JP2021/039732 dated Dec. 14, 2021.
Extended European Search Report dated Mar. 28, 2024 for corresponding European Application No. 21889113.3.

\* cited by examiner (a)

(b)

LOAD DETECTION DEVICE AND LOAD DETECTION SYSTEM HAVING GUIDE PLATE PROVIDED WITH SLOPE AND HANDLE

CROSS-REFERENCE TO RELATED APPLICATIONS

This application is a national stage entry of International Application No. PCT/JP2021/039732 filed on Oct. 28, 2021, which claims the benefit of priority to Japanese Application No. JP2020-184259, filed Nov. 4, 2020, the entire disclosures of which are hereby incorporated herein by reference.

TECHNICAL FIELD

The present invention relates to a load detection device and a load detection system.

BACKGROUND ART

In the fields of medical care and nursing care, detecting a load of a subject on a bed by using a load detector and, based on the detected load, determining whether the subject is present on the bed (present-on-bed determination) and acquiring biological information (respiration rate, heart rate, etc.) of the subject have been proposed.

Patent Document 1 discloses a load detector having a slope for a caster of a bed.

CITATION LIST

Patent Literature

Patent Document 1: JP 5143946 B

SUMMARY OF INVENTION

Technical Problem

A bed used in a hospital or a nursing care facility is generally provided with casters for assisting movement of the bed. However, since the bed is a heavy object, it is not easy to move the bed using the casters. In particular, placing a caster provided on a leg of the bed on a placement plate portion of the load detector as disclosed in Patent Document 1 is work requiring force and time.

An object of the present invention is to provide a load detection device and a load detection system such that a caster of a bed can be easily placed on a placement unit and the load detection device and the load detection system are easy to carry.

Solution to Problem

According to a first aspect of the present invention, there is provided a load detection device installed under a caster of a bed, the load detection device including:
    a placement unit, the caster being placed on the placement unit;
    a load detection unit configured to detect a load applied to the placement unit; and
    a guide plate having an annular shape and surrounding the placement unit, wherein
    the guide plate is provided with a slope configured to guide the caster to the placement unit and a handle for moving the load detection device, and the slope includes a first slope provided adjacent to the placement unit in a predetermined direction, and a second slope provided adjacent to the placement unit in a direction orthogonal to the predetermined direction.

In the load detection device according to the first aspect, the guide plate having an annular shape may include a thin plate region and a thick plate region along a circumferential direction, the thick plate region having a thickness larger than a thickness of the thin plate region, and the slope may be provided in the thin plate region, and the handle may be provided in the thick plate region.

In the load detection device according to the first aspect, an inner peripheral surface of the thick plate region of the guide plate may define a stop wall configured to restrict movement of the caster away from the placement unit.

In the load detection device according to the first aspect, the stop wall may be provided at a side of the placement unit opposite to the first slope in the predetermined direction and at a side of the placement unit opposite to the second slope in the direction orthogonal to the predetermined direction.

In the load detection device according to the first aspect, an inclined surface rising from an upper surface of the thin plate region toward an upper surface of the thick plate region may be provided between the thin plate region and the thick plate region.

In the load detection device according to the first aspect, the guide plate may have a substantially rectangular outer periphery, and the handle may include a notch provided at a lower surface of the guide plate at a corner portion of the substantially rectangular outer periphery and in the thick region, and a through hole extending between an upper surface of the guide plate and the notch.

In the load detection device according to the first aspect, in the guide plate, a width in the predetermined direction of the first slope may be larger than a width in the predetermined direction of a region located at a side opposite to the first slope across the placement unit.

The load detection device according to the first aspect may further include a connector for transmitting an output from the load detection unit to the outside, wiring being detachably connected to the connector, wherein a slit may be provided in a region of the guide plate above the connector, and the connector may be exposed by lifting a region adjacent to the slit at an upper surface of the guide plate.

In a load detector according to the first aspect, the placement unit may be provided with a discharge port configured to discharge liquid at an upper surface of the placement unit to a lower side of the placement unit.

According to a second aspect of the present invention, there is provided a load detection system configured to detect a load of a subject on a bed, the load detection system including:
    a plurality of load detection devices; and
    a control unit connected to the plurality of load detection devices, the control unit being configured to acquire the load of the subject based on outputs of the plurality of load detection devices, wherein
    each of the plurality of load detection devices is the load detection device according to the first aspect.

Advantageous Effects of Invention

In the load detection device and the load detection system of the present invention, a caster of a bed can be easily placed on a placement unit, and the load detection device and the load detection system are easy to carry.

DESCRIPTION OF EMBODIMENTS

First Embodiment

The load detection device 100 according to the first embodiment of the present invention will be described by taking, as an example, a case where a load detection device 100 is used together with a bed BD in a hospital.

Figure 1:
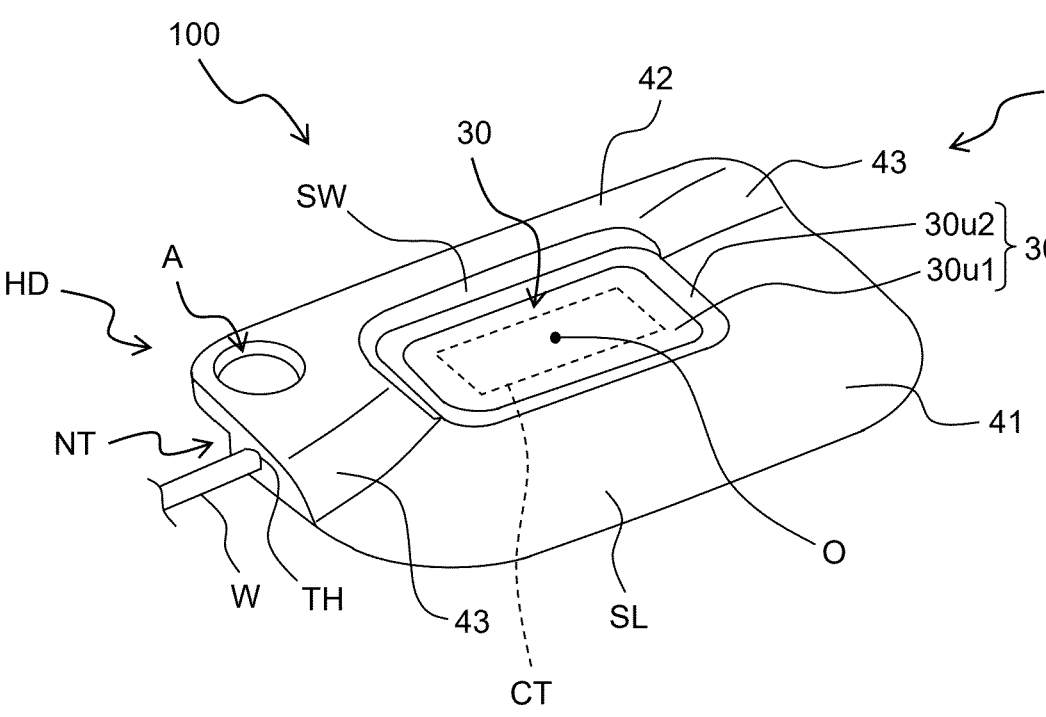
FIG. 1 is a perspective view of a load detection device according to a first embodiment of the present invention.
Figure 2:
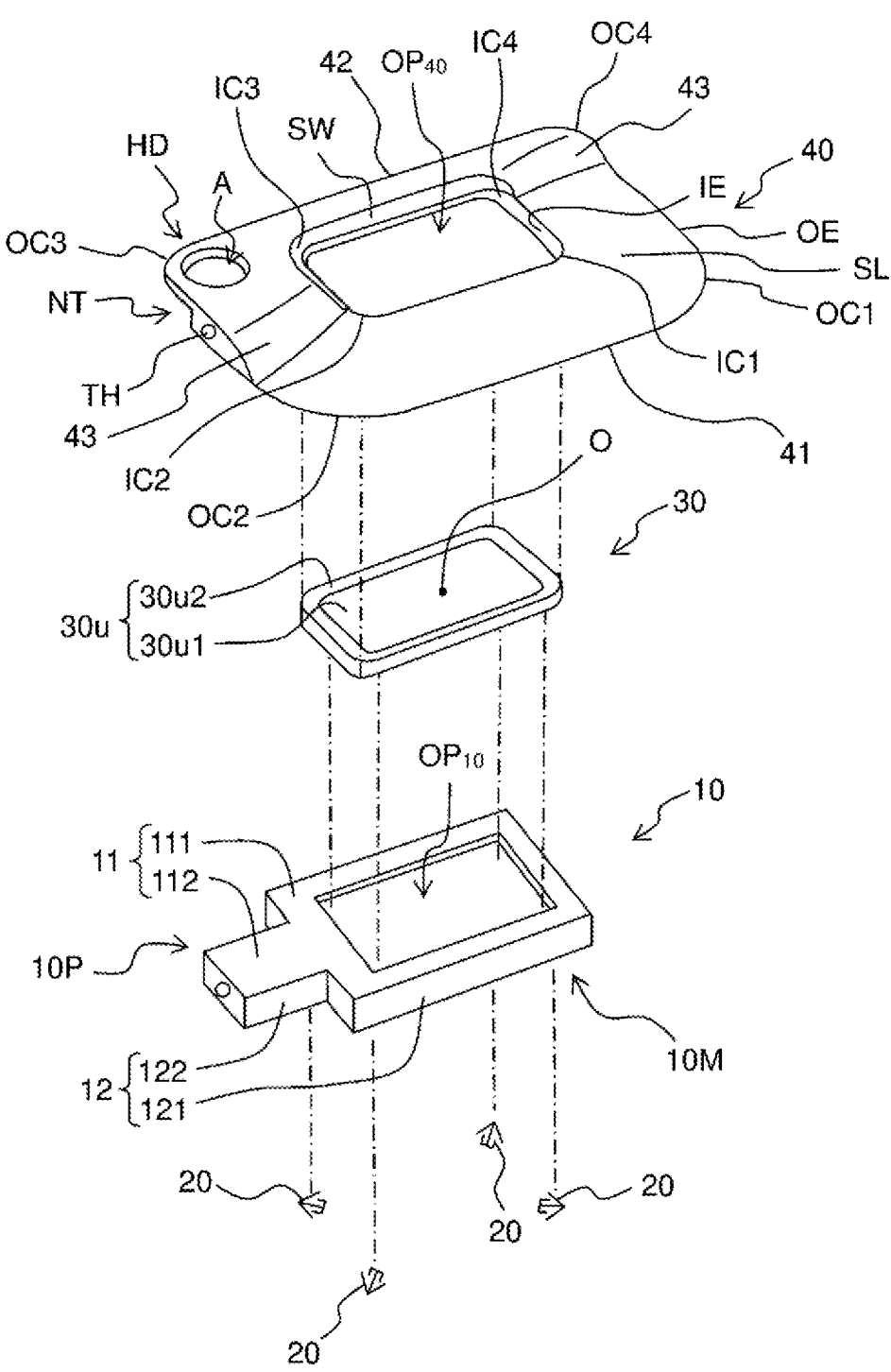
FIG. 2 is an exploded perspective view of the load detection device according to the first embodiment of the present invention.

As illustrated in FIGS. 1 and 2, the load detection device 100 of the first embodiment mainly includes a base portion 10, four strain sensor units 20 attached to a lower surface of the base portion 10, a placement unit 30 having a substantially rectangular shape in a plan view and supported by the four strain sensor units 20 at the upper side of the base portion 10, and an annular guide plate 40 attached to the base portion 10 and disposed around the placement unit 30. The guide plate 40 has a slope SL for guiding a caster CT of a leg portion of the bed BD to the placement unit 30.

In the following description, a center O of the placement unit 30 is a center of the load detection device 100. Further, a transverse direction of the placement unit 30 is referred to as a front-rear direction of the load detection device 100, a longitudinal direction of the placement unit 30 is referred to as a width direction of the load detection device 100, and a direction orthogonal to the front-rear direction and the width direction is referred to as an up-down direction of the load detection device 100. In the front-rear direction, with respect to the placement unit 30, the side with the slope SL is referred to as a front side. In the width direction, a right side and a left side as viewed from the front side are referred to as the right side and the left side in the width direction.

Figure 3:
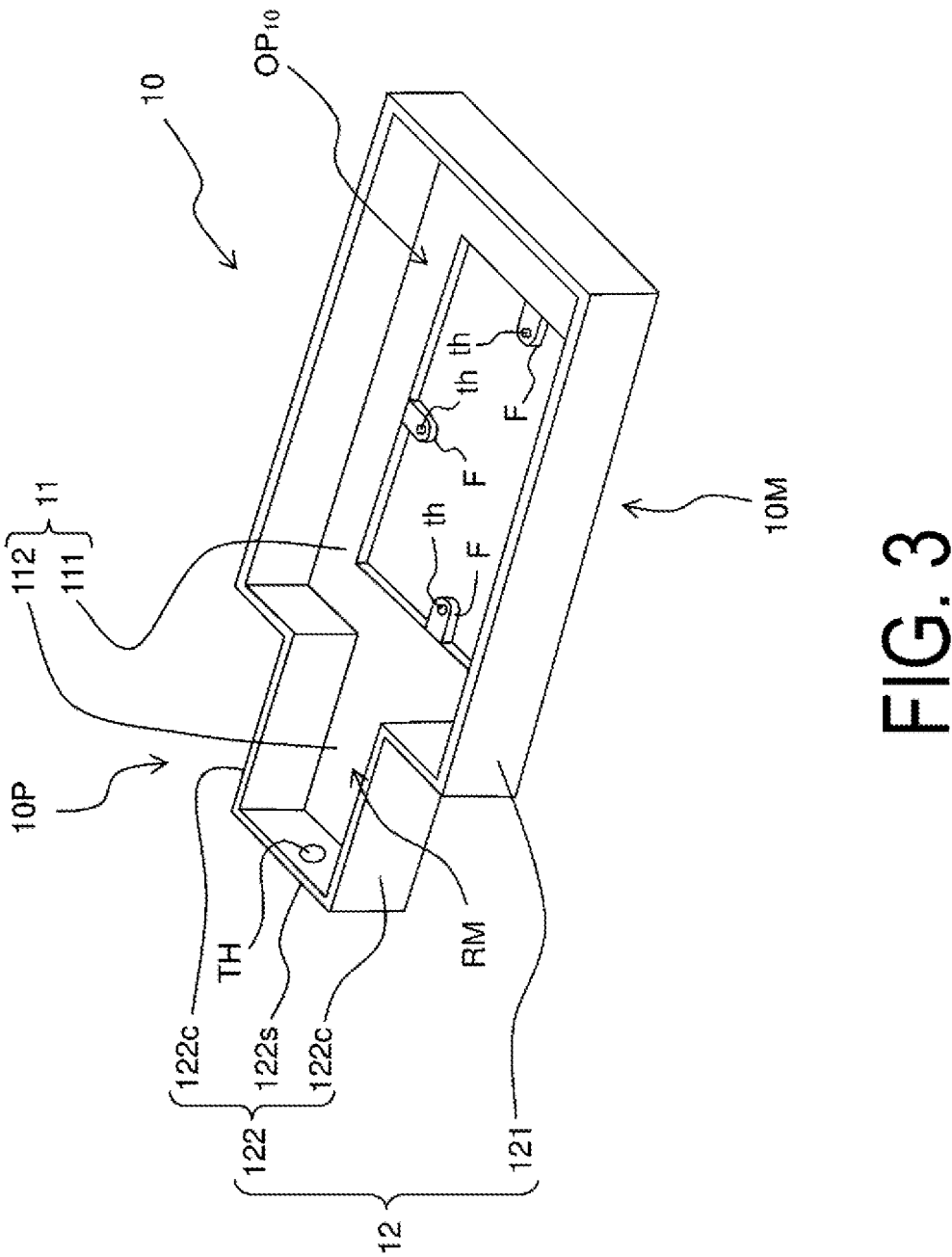
FIG. 3 is a perspective view of a base portion as viewed from below.

The base portion 10 is formed of, for example, a resin such as ABS or PC. As illustrated in FIGS. 2 and 3, the base portion 10 includes a top plate 11 disposed horizontally and a wall portion 12 extending vertically downward from an outer peripheral edge of the top plate 11.

The top plate 11 includes a main portion 111 having a rectangular outer shape in a plan view and a substantially rectangular protruding portion 112 protruding leftward in the width direction from a part of an outer peripheral edge of the main portion 111. An opening $OP_{10}$ having a rectangular shape in a plan view is formed at the central portion of the main portion 111.

Figure 5:
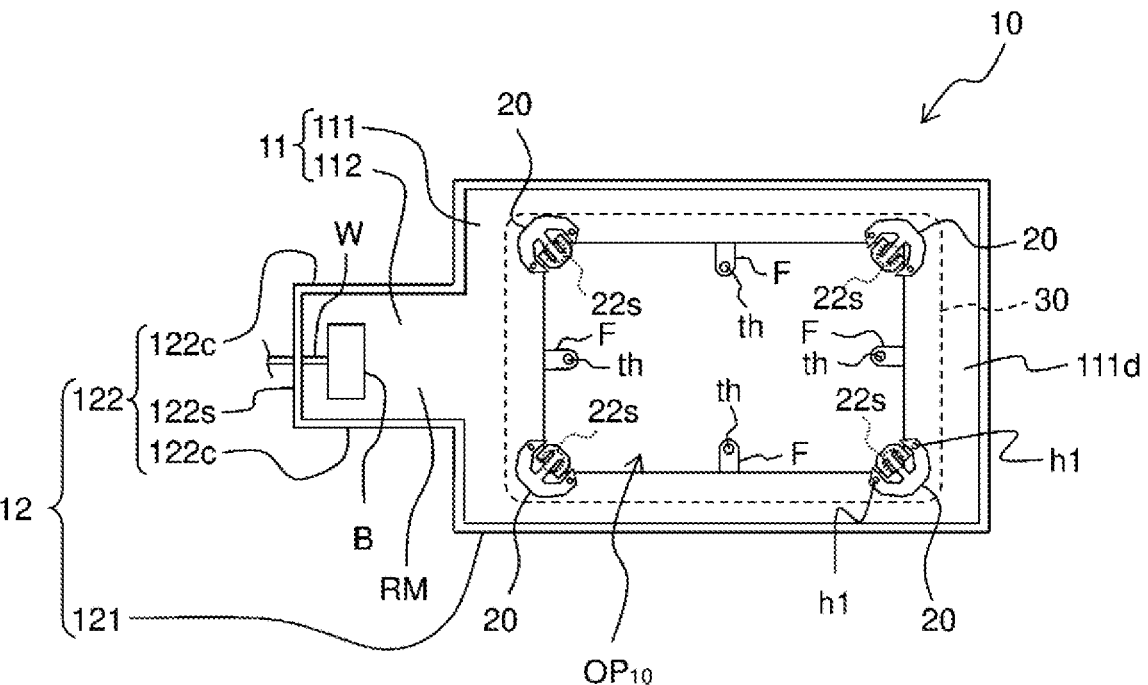
FIG. 5 is a bottom view illustrating a positional relationship among the base portion, the strain sensor unit, and a placement plate.

A fixing piece F protruding toward the center of the opening $OP_{10}$ is provided at the central portion of each side of the main portion 111 defining the opening $OP_{10}$ (see FIGS. 3 and 5; not illustrated in FIG. 2). Each of four of the fixing pieces F is provided with a through hole th penetrating through the fixing piece F in the up-down direction.

The wall portion 12 includes a peripheral wall portion 121 and a protruding wall portion 122. The peripheral wall portion 121 extends vertically downward from the outer peripheral edge of the main portion 111 of the top plate 11. The protruding wall portion 122 extends vertically downward from the outer peripheral edge of the protruding portion 112 of the top plate 11. The height of the wall portion 12 may be, for example, about 5 mm to 25 mm.

The peripheral wall portion 121 is substantially C-shaped in a plan view, and the protruding wall portion 122 is substantially U-shaped in a plan view. The protruding wall portion 122 includes a sidewall portion 122s extending in the front-rear direction and a pair of connecting walls 122c extending in the width direction from both ends of the sidewall portion 122s and connected to both ends of the peripheral wall portion 121. A through hole TH is provided in the sidewall portion 122s.

The main portion 111 of the top plate 11 and the peripheral wall portion 121 of the wall portion 12 constitute a main body portion 10M of the base portion 10. The protruding portion 112 of the top plate 11 and the protruding wall portion 122 of the wall portion 12 constitute a protruding portion 10P of the base portion 10. A space defined by a lower surface of the protruding portion 112 and the inner surface of the protruding wall portion 122 at the lower side of the protruding portion 10P serves as a substrate arrangement chamber RM (FIGS. 3 and 5). In the substrate arrangement chamber RM, there is disposed a substrate B, and the substrate B constitutes a Wheatstone bridge by collecting wiring (not illustrated) from the strain sensor unit 20 (FIG. 5). Wiring W connecting the substrate B and the outside extends to the outside of the base portion 10 via the through hole TH.

Figure 4:
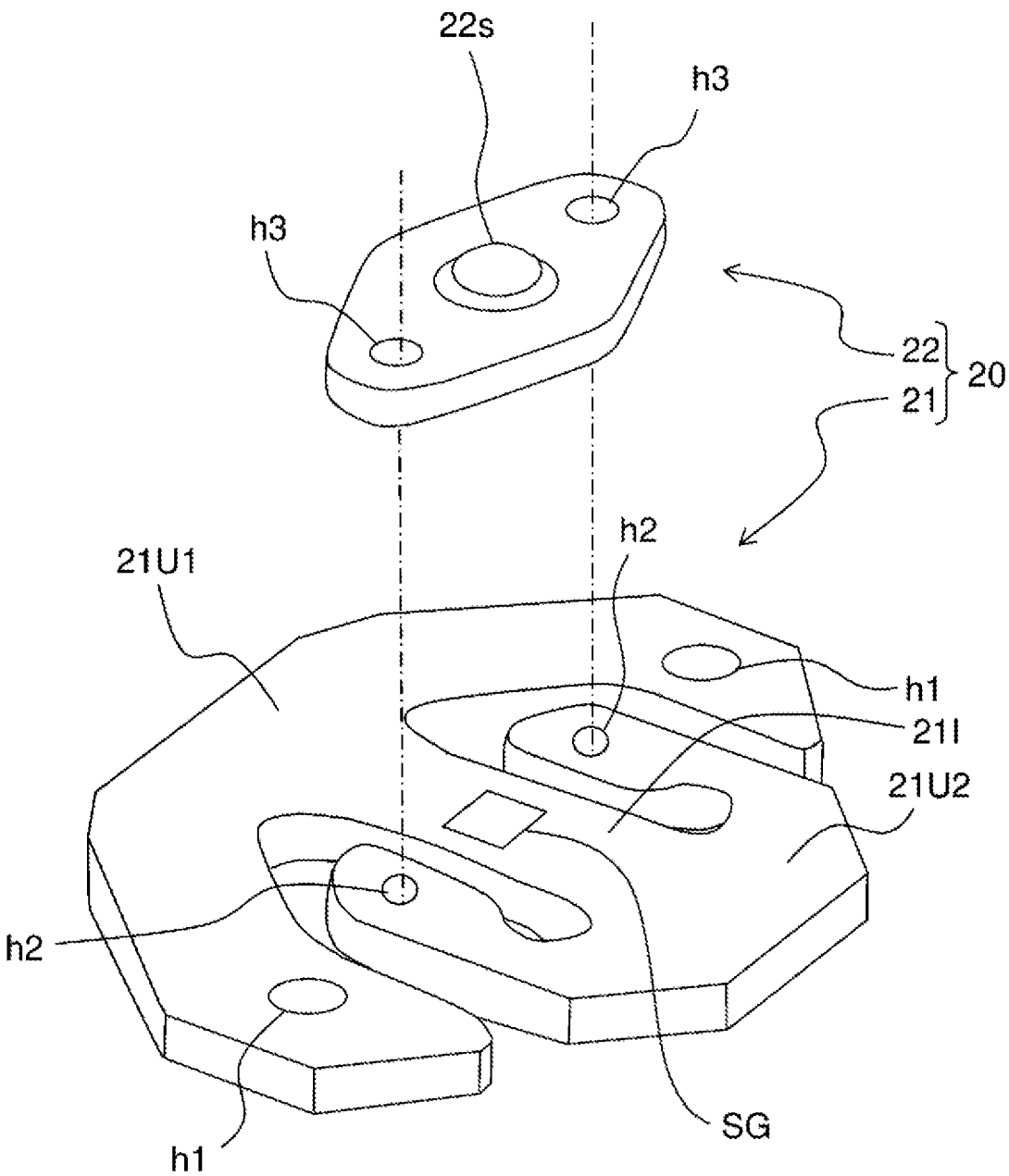
FIG. 4 is an exploded perspective view of a strain sensor unit as viewed from above.

As illustrated in FIG. 4, the strain sensor unit 20 mainly includes a strain generation portion 21 and a load transmission portion 22.

The strain generation portion 21 includes a first U-shaped member 21U1, a second U-shaped member 21U2 opposed to the first U-shaped member 21U1, and an I-shaped member 21I connecting a central portion of the first U-shaped member 21U1 and a central portion of the second U-shaped member 21U2. The first U-shaped member 21U1, the second U-shaped member 21U2, and the I-shaped member 21I are made of metals such as stainless steel (SUS304).

Screw holes h1 are provided in the vicinity of both ends of the first U-shaped member 21U1. Coupling holes h2 are provided in the vicinity of both ends of the second U-shaped member 21U2. The two screw holes h1 and the two coupling holes h2 are disposed in a straight line along a direction orthogonal to the extending direction of the I-shaped member 21I.

A strain gauge SG is attached to a central portion of the I-shaped member 21I. The strain gauge SG is disposed so as to be positioned on a straight line connecting the two screw holes h1 and the two coupling holes h2.

The load transmission portion 22 has a substantially rhombic shape and is made of stainless steel (SUS304) or the like.

A support base 22s protruding upward in a hemispherical shape is formed at a central portion of the load transmission portion 22. Coupling holes h3 are formed in the vicinity of both ends of the load transmission portion 22 in the longitudinal direction. The support base 22s and the two coupling holes h3 are disposed in a straight line along the longitudinal direction of the load transmission portion 22.

The strain generation portion 21 and the load transmission portion 22 are fixedly connected to each other by connecting each of the two coupling holes h2 of the strain generation portion 21 and each of the two coupling holes h3 of the load transmission portion 22 with pins (not illustrated) via a spacer (not illustrated). In a state where the strain generation portion 21 and the load transmission portion 22 are connected to each other, a lower surface of the load transmission portion 22 and an upper surface of the strain generation portion 21 are separated from each other by a thickness of a spacer (not illustrated). The strain gauge SG is located directly below the support base 22s.

When a load is applied to the support base 22s of the load transmission portion 22 from above in a state where the strain generation portion 21 is supported from below the screw holes h1, the second U-shaped member 21U2 of the strain generation portion 21 moves downward, and strain is generated in the I-shaped member 21I. The amount of strain is detected by the strain gauge SG. Since the screw holes h1 and the support base 22s are disposed on a straight line, it is possible to perform strain detection with high accuracy while suppressing the influence of a moment.

As illustrated in FIG. 5, in the opening $OP_{10}$ of the base portion 10, the strain sensor units 20 are fixed to four corners of the opening $OP_{10}$, one at each corner. To be specific, each of the strain sensor units 20 is screwed to a lower surface 111d of the main portion 111 of the top plate 11 via the screw holes h1 of the first U-shaped member 21U1 in a state where the support base 22s of the load transmission portion 22 is directed upward. In this state, inside the opening $OP_{10}$, the support base 22s of the strain sensor units 20 is located at the four corners of the opening $OP_{10}$.

The placement unit 30 is a flat plate having a substantially rectangular shape in a plan view, and includes four corners rounded in an arc shape. The placement plate 30 is formed of, for example, an aluminum die-cast material (ADC12).

An upper surface 30u (FIG. 2) of the placement unit 30 includes a central region 30u1 and a peripheral region 30u2 provided around the central region 30u1. The central region 30u1 is a flat surface having a substantially rectangular shape in a plan view. The peripheral region 30u2 has a hollow square shape (O-shape) in a plan view, and is an inclined surface rising as the distance from the center O increases.

The placement unit 30 is disposed at the upper side of the top plate 11 of the base portion 10, parallel to the top plate 11 (FIGS. 2 and 5). In this state, the placement unit 30 is supported by the support base 22s of the strain sensor unit 20 at four points in the vicinity of the four corners (FIG. 5).

In addition, the placement unit 30 is inseparably connected to the base portion 10 by screwing, to a lower surface of the placement unit 30 via the through hole th, a screw having a diameter smaller than a diameter of the through hole th into the through hole th of each of the four fixing pieces F. Since each screw does not come into contact with the fixing piece F, the vertical movement of the placement unit 30 is not hindered, and the measurement accuracy is maintained.

The guide plate 40 is a member for providing a slope for guiding the caster CT of the bed BD from the floor surface where the load detection device 100 is installed to the upper surface 30u of the placement unit 30, and a handle for moving the load detection device 100.

The guide plate 40 is integrally formed of, for example, an elastomer resin.

As mainly illustrated in FIG. 2, the guide plate 40 is a plate-shaped member having a D-ring shape (D-shaped ring) in a plan view, and has an outer peripheral edge OE and an inner peripheral edge IE.

The outer peripheral edge OE is substantially rectangular in a plan view, and includes a pair of short sides extending in the front-rear direction and a pair of long sides extending in the width direction. Four corner portions OC1, OC2, OC3, and OC4 of the outer peripheral edge OE are each rounded in an arc shape. The radii of curvature of the two corner portions OC1 and OC2 located at the front side in the front-rear direction are larger than the radii of curvature of the two corner portions OC3 and OC4 located at the rear side in the front-rear direction.

The inner peripheral edge IE is substantially rectangular in a plan view, and includes a pair of short sides extending in the front-rear direction and a pair of long sides extending in the width direction. Four corner portions IC1, IC2, IC3, and IC4 of the inner peripheral edge IE are each rounded in an arc shape. The radii of curvature of the four corner portions IC1, IC2, IC3, and IC4 are equal to each other.

An accommodation hole $OP_{40}$ is defined at the central portion of the guide plate 40 by the inner peripheral edge IE of the guide plate 40.

The guide plate 40 is, in the circumferential direction of the D-ring, roughly divided into a slope region 41 with a slope being provided and a non-slope region 42 without a slope being provided.

The slope region 41 is generally a region of the guide plate 40 located at the front side of the accommodation hole $OP_{40}$ and a region of the guide plate 40 located at the right side of the accommodation hole $OP_{40}$.

In the slope region 41, the upper surface of the guide plate 40 defines the slope SL rising from the outer peripheral edge OE toward the inner peripheral edge IE. The slope SL includes a portion (first slope) adjacent to the placement unit 30 in the front-rear direction and located at the front side of the placement unit 30, and a portion (second slope) adjacent to the placement unit 30 in the width direction and located at the right side of the placement unit 30. The inclination angle of the slope SL is arbitrary, and is desirably 10 degrees or less, and more desirably about 7 degrees to 9 degrees. However, no such limitation is intended.

By setting the inclination angle of the slope SL to a small value, the caster CT and the bed BD can be easily raised and lowered with respect to the placement unit 30 while reducing the impact applied to the patient on the bed BD. On the other hand, reducing the inclination angle of the slope SL means that the dimension of the slope SL in the inclination direction (i.e., the length of the slope) increases. The above-described preferable range of the inclination angle is set in consideration of the balance between these viewpoints.

The non-slope region 42 is generally a region of the guide plate 40 located rearward of the accommodation hole $OP_{40}$ and a region of the guide plate 40 located leftward of the accommodation hole $OP_{40}$.

The thickness of the guide plate 40 in the non-slope region 42 (that is, the dimension in the up-down direction) is larger than the thickness of the guide plate 40 in the slope region 41 (that is, the dimension in the up-down direction at the inner peripheral edge IE side, the inner peripheral edge IE being the upper end side of the slope SL). Therefore, inclined surfaces 43 rising from the slope region 41 toward the non-slope region 42 is provided between the slope region 41 and the non-slope region 42. Each of the inclined surfaces 43 is an inclined surface on an upwardly convex curved surface in a side view. In this manner, by forming the upper surface of the guide plate 40 as the curved inclined surface at a connection portion between the slope region 41 and the non-slope region 42, it is possible to prevent damage to a caster deviating from the slope SL. However, a vertical wall may be provided between the slope region 41 and the non-slope region 42 without providing the inclined surfaces 43.

A handle HD for moving the load detection device 100 is formed in a region in the vicinity of the corner portion OC3 at the rear side and the left side of the outer peripheral edge OE in the non-slope region 42.

In the first embodiment, the handle HD is formed by providing a notch NT (FIG. 6) at a lower surface 40d of the guide plate 40 in a region in the vicinity of the corner portion OC3 at the rear side and the left side of the outer peripheral edge OE to make the guide plate 40 into a thin plate shape, and providing an opening A having a circular shape in a plan view with the opening A vertically penetrating through the thin plate portion.

In the non-slope region 42, a stop wall SW is provided along the inner peripheral edge IE of the guide plate 40. More specifically, the inner peripheral surface of the guide plate 40 defines the stop wall SW. The stop wall SW is an inclined surface rising from the inner peripheral edge IE toward the outer peripheral edge OE side at a predetermined angle.

In the guide plate 40, the width in the front-rear direction of the region located at the front side of the accommodation hole $OP_{40}$, that is, the region where the slope SL is provided, is larger than the width in the front-rear direction of the region located at the rear side of the accommodation hole $OP_{40}$, that is, the region where the stop wall SW is provided. That is, the accommodation hole $OP_{40}$ is provided closer to the rear side than to the central portion of the guide plate 40 in a plan view. Accordingly, it is possible to increase the dimension of the slope SL in the inclination direction and to decrease the inclination angle of the slope SL without increasing the entire dimension of the guide plate 40.

Figure 6:
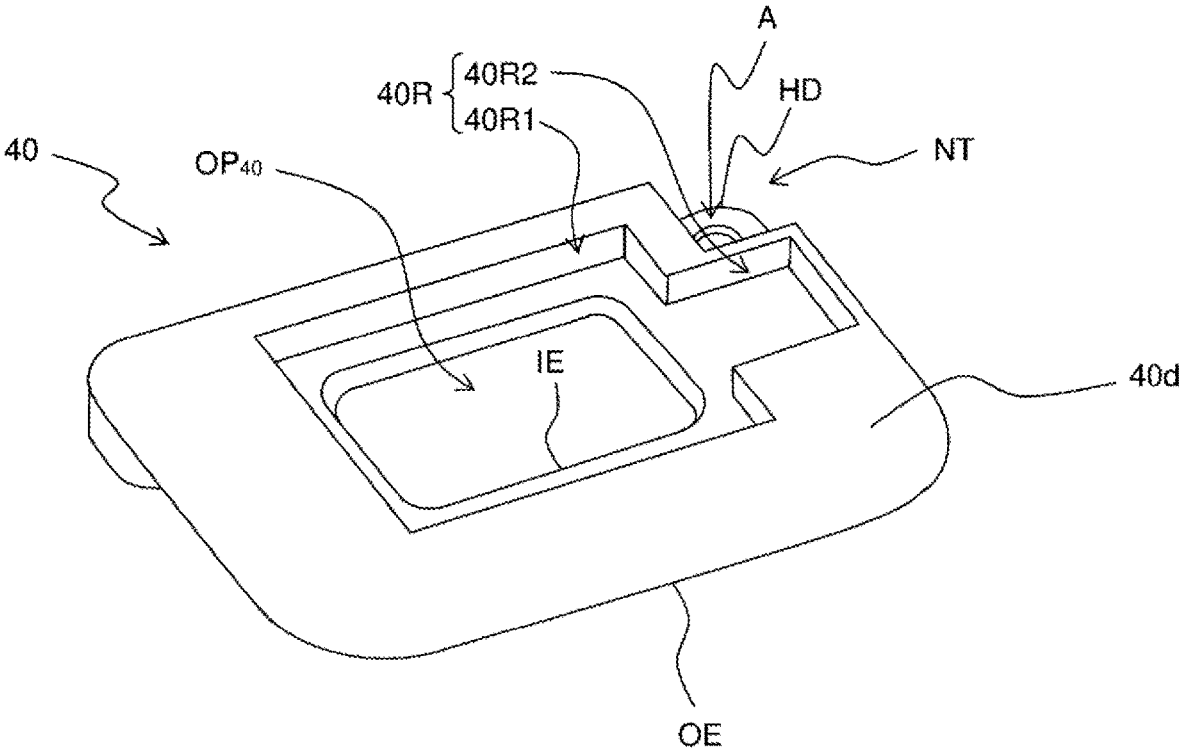
FIG. 6 is a perspective view of a guide plate as viewed from below.

As illustrated in FIG. 6, a recessed portion 40R is formed in the lower surface 40d of the guide plate 40. The recessed portion 40R includes a central portion 40R1 having a rectangular shape in a plan view and a protruding portion 40R2 protruding leftward from the central portion 40R1.

The center of the central portion 40R1 is aligned with the center of the accommodation hole $OP_{40}$. The protruding portion 40R2 is provided in the non-slope region 42. The protruding portion 40R2 is adjacent to the handle HD along the front-rear direction.

Figure 7:
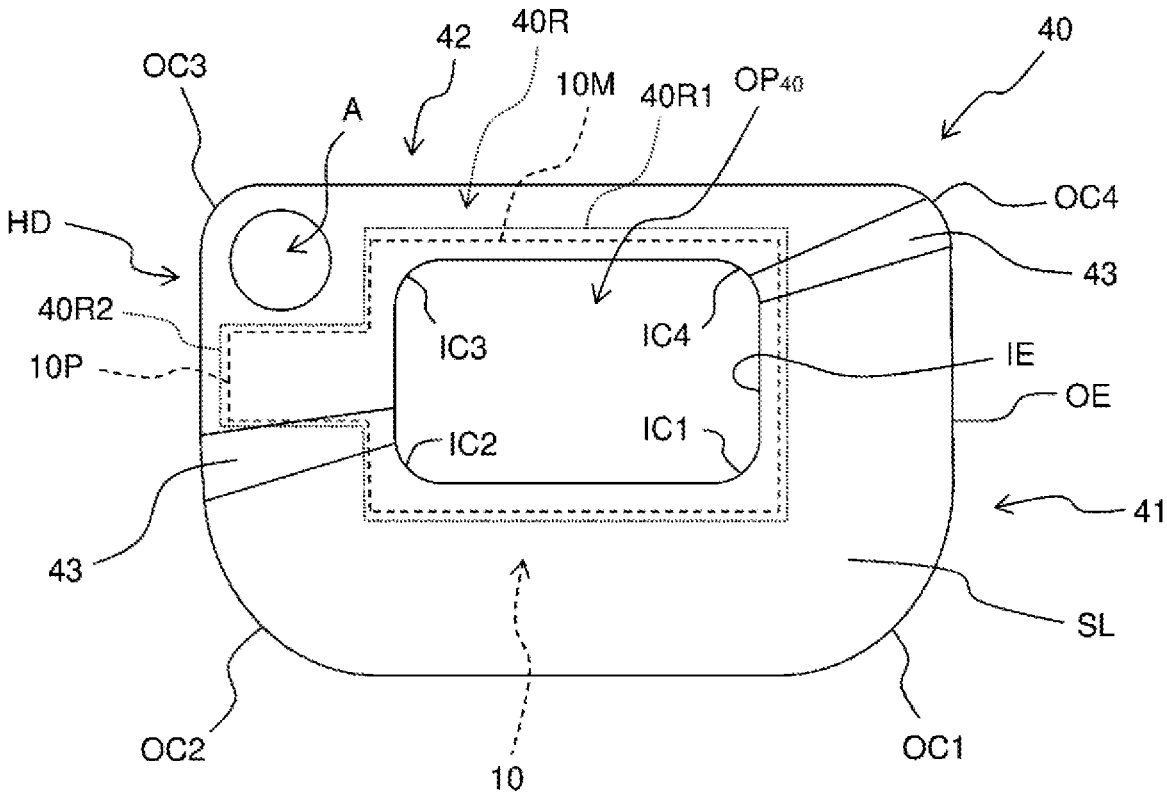
FIG. 7 is a schematic plan view illustrating a positional relationship between the base portion and the guide plate.

As illustrated in FIG. 7, the guide plate 40 is attached to the base portion 10 by accommodating the base portion 10 in the recessed portion 40R. To be specific, the main body portion 10M of the base portion 10 is accommodated in the central portion 40R1, and the protruding portion 10P of the base portion 10 is accommodated in the protruding portion 40R2. The guide plate 40 may be fixed to the base portion 10 by a screw or the like (not illustrated).

Figure 8:
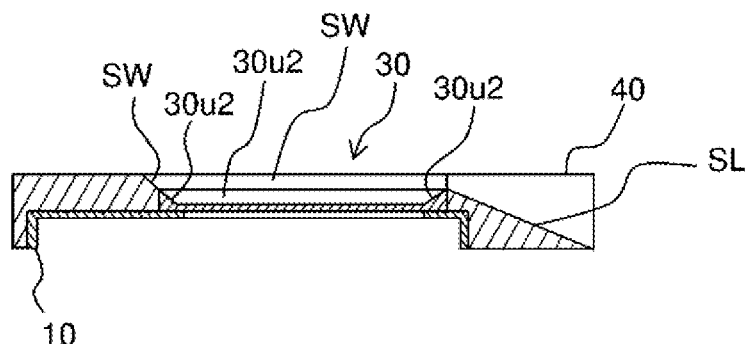
FIG. 8(a) is a cross-sectional view of the load detection device according to the first embodiment of the present invention taken along a plane including a center O and orthogonal to the front-rear direction.
FIG. 8(b) is a cross-sectional view of the load detection device according to the first embodiment of the present invention taken along a plane including the center O and orthogonal to the width direction.
Figure 8:
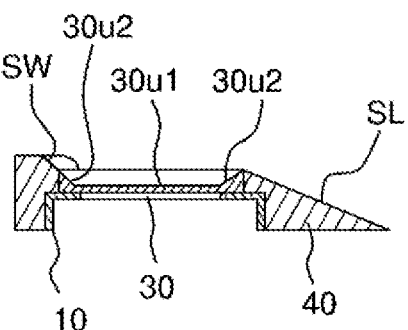

In a state where the base portion 10 is accommodated in the recessed portion 40R of the guide plate 40, the placement unit 30 is disposed inside the accommodation hole $OP_{40}$. As illustrated in FIGS. 8(a) and 8(b), in this state, the outer edge of the front-side and right-side peripheral region 30u2 of the upper surface 30u of the placement unit 30 is connected to the upper end of the slope SL without a step. In addition, the outer edge of the rear-side and left-side peripheral region 30u2 of the placement unit 30 and the lower end of the stop wall SW are connected so as to be substantially flush with each other, forming a continuous inclined wall surface.

As described above, the stop wall SW is provided at the side opposite to the slope SL of the placement unit 30 in the front-rear direction and at the side opposite to the slope SL of the placement unit 30 in the left-right direction.

When the caster CT provided under the leg portion of the bed BD is placed on the load detection device 100 of the first embodiment, the caster CT on the floor surface is moved to the upper surface 30u of the placement unit 30 via the slope SL. The caster CT lifted up to the upper surface 30u of the placement unit 30 comes into contact with the stop wall SW to stop advancing, and is placed on the central region 30u1 of the upper surface 30u.

Effects of the load detection device 100 according to the first embodiment are summarized below.

In the load detection device 100 of the first embodiment, the slope SL is provided at the front side and the right side of the placement unit 30. That is, the slope SL is provided adjacent to the placement unit 30 in two directions orthogonal to each other. Therefore, the caster CT of the bed BD can be guided to the placement unit 30 from a plurality of directions.

In the load detection device 100 of the first embodiment, the guide plate 40 is provided with the handle HD for moving the load detection device 100. Therefore, the load detection device 100 can be easily moved by gripping the handle HD.

In the load detection device 100 of the first embodiment, the stop wall SW defined by the inner peripheral surface of the guide plate 40 is provided at the side of the placement unit 30 opposite to the slope SL in the front-rear direction and at the side of the placement unit 30 opposite to the slope SL in the left-right direction. Therefore, a caster having ascended the slope SL and having reached the placement unit 30 can be brought into contact with the stop wall SW and stopped on the placement unit 30 in a favorable manner.

Modified Example

In the first embodiment, the following modified example can also be used.

In the load detection device 100 of the first embodiment, the base portion 10 and the four strain sensor units 20 constitute a load detection unit detecting a load applied to the placement unit 30. However, no such limitation is intended, and the load detection unit detecting the load applied to the placement unit 30 may have any structure.

Specifically, for example, the load detection unit may include a base portion and a beam type load cell supported by the base portion in a cantilever manner. In this case, the placement unit 30 is fixed to the free end of the beam type load cell.

The base portion may be omitted, and the strain sensor unit 20 or the cantilever beam type load cell may be directly fixed to the guide plate 40. The guide plate 40 may be formed of a resin such as ABS or PC. In this case, each of the strain sensor unit 20 and the beam type load cell constitutes a load detection unit.

In the load detection device 100 of the first embodiment, the placement unit 30 has a substantially rectangular plate shape in a plan view, but no such limitation is intended. The shape of the placement unit 30 in a plan view may be a shape other than a rectangle, for example, a circle or a square.

In the load detection device 100 of the first embodiment, the shape of the guide plate 40 in a plan view is substantially D-shaped, but no such limitation is intended. The shape of the guide plate 40 in a plan view may be any annular shape such as a circular ring shape.

In the load detection device 100 of the first embodiment, the thickness of the guide plate 40 in the entire region of the non-slope region 42 is larger than the thickness of the guide plate 40 in the slope region 41. However, no such limitation is intended, and the guide plate 40 may be configured to be thicker than the slope region 41 only in a portion of the non-slope region 42. Alternatively, the thickness of the guide plate 40 in the non-slope region 42 may be the same as the thickness of the guide plate in the slope region 41.

The handle HD may be provided in a region of the non-slope region 42 having a thickness larger than a thickness of the slope region 41, or may be provided in a region having the same thickness as the thickness of the slope region 41.

In the load detection device 100 of the first embodiment, the handle HD is constituted of the notch NT and the opening A having a circular shape in a plan view in the vicinity of the corner portion OC3 of the guide plate 40. However, no such limitation is intended.

Specifically, for example, the handle HD may be provided at a portion of the non-slope region 42, the portion being located at the central portion in the width direction and at the rear side of the placement unit 30. Alternatively, the handle HD may be formed only by the notch NT without providing the opening A. In this case, the load detection device 100 is moved by gripping a portion being thin due to the presence of the notch NT.

In addition, the handle HD may have an arbitrary structure, but it is possible to prevent contact between the handle HD and the caster CT by adopting a structure such that the handle HD does not protrude upward from the upper surface of the guide plate 40. The handle HD is preferably provided at a position different from the region of the guide plate 40 where the slope SL is formed.

Figure 9:
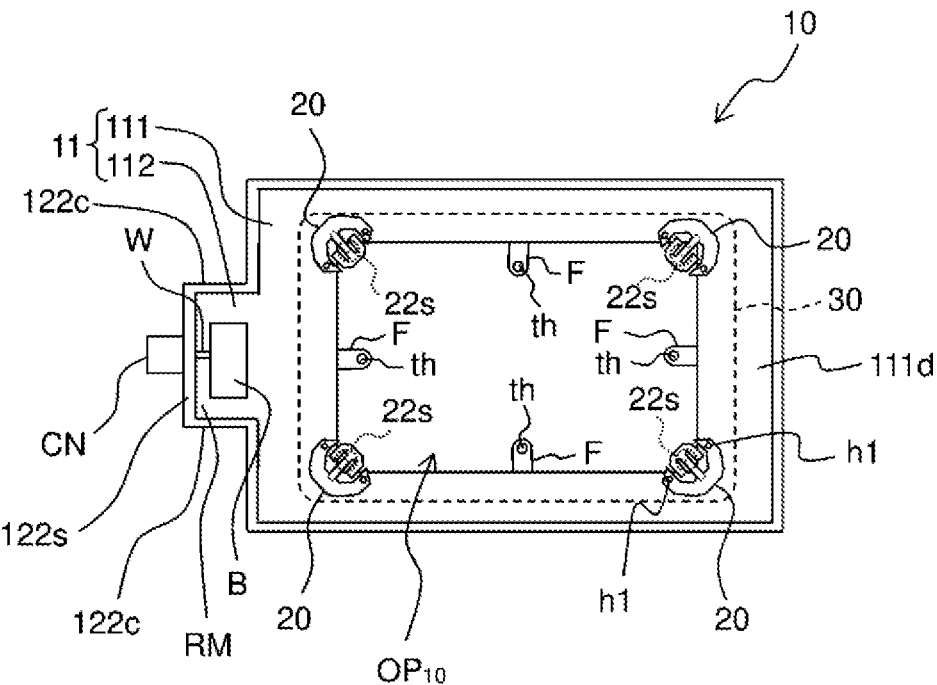
FIG. 9 is a bottom view illustrating a positional relationship among a base portion, a strain sensor unit, and a placement plate according to a modified example.

In the load detection device 100 of the first embodiment, the wiring W extending from the substrate B is extended to the outside of the load detection device 100 via the through hole TH of the guide plate 40, but no such limitation is intended. To be specific, for example, as illustrated in FIG. 9, a connector (wiring connection portion) CN for detachably connecting the wiring from the outside may be provided at the sidewall portion 122*s*, and the substrate B and the connector CN may be connected by the wiring W.

In this case, a slit may be provided in a region located above the protruding portion 40R2 of the recessed portion 40R of the guide plate 40, and a region in the vicinity of the slit may be turned up to expose the protruding portion 40R2.

Figure 10:
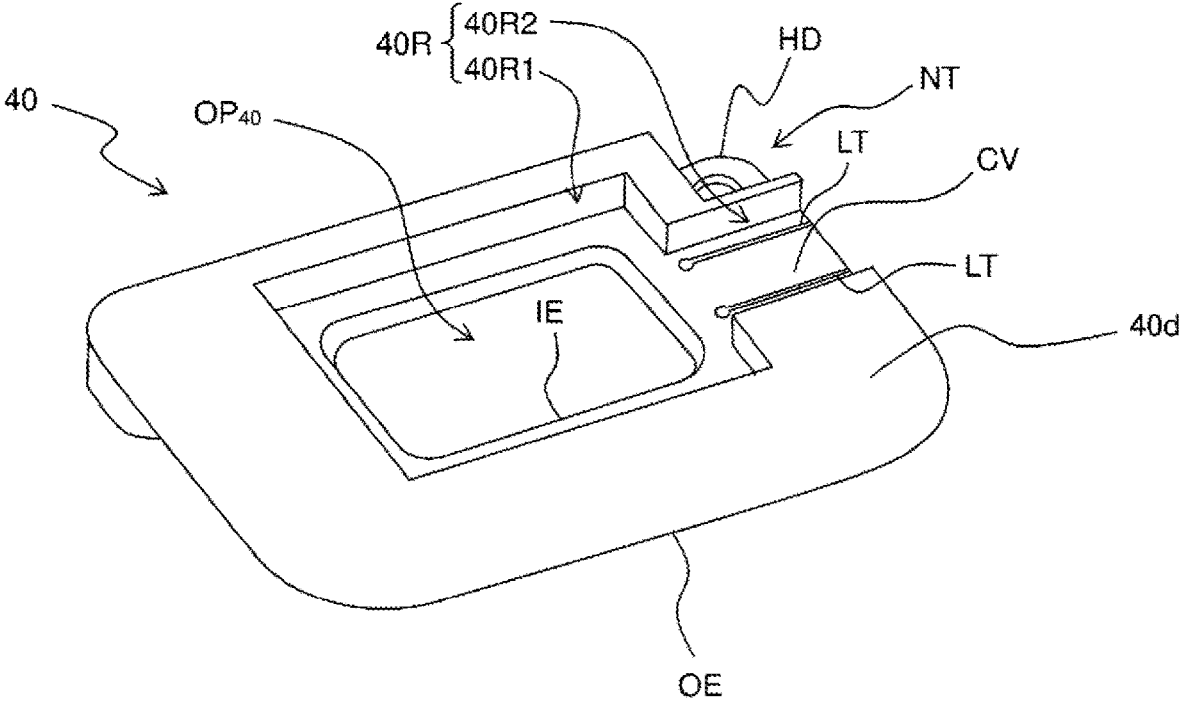
FIG. 10 is a perspective view of a guide plate according to the modified example as viewed from below.
Figure 11:
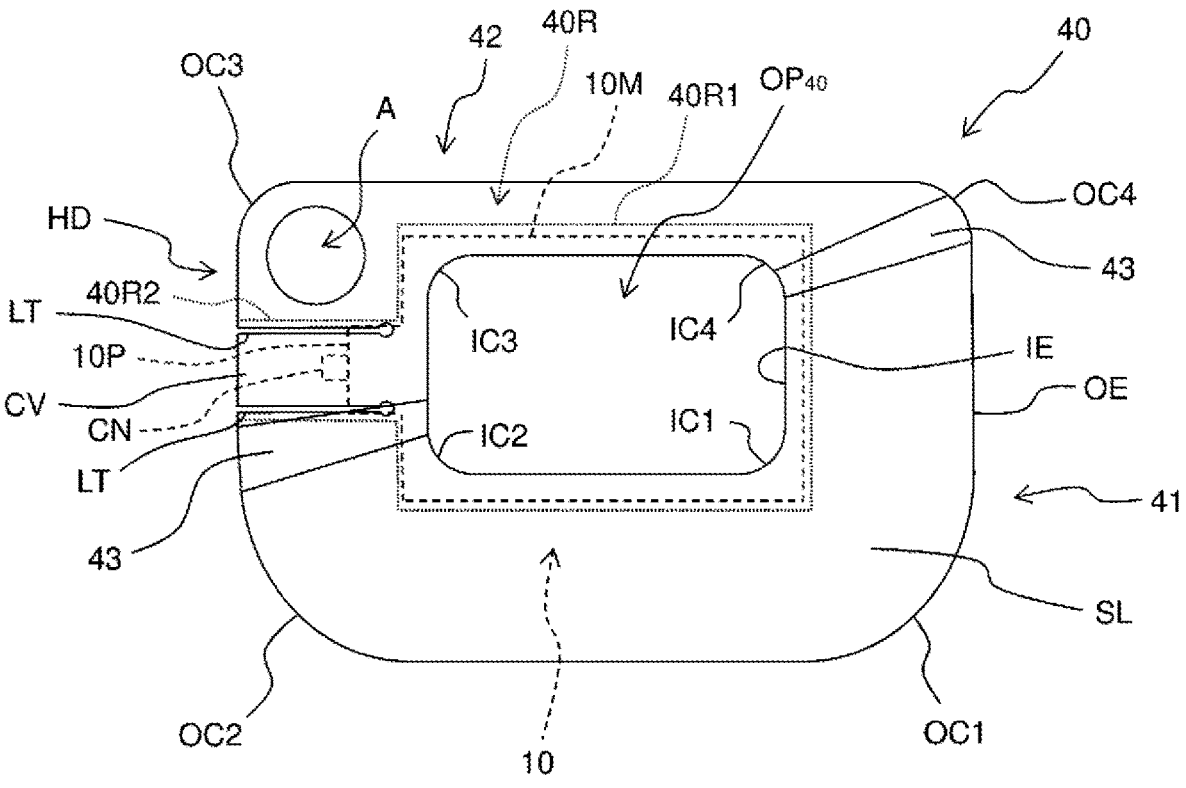
FIG. 11 is a schematic plan view illustrating a positional relationship between the base portion of the modified example and a guide plate of the modified example.

To be specific, for example, as illustrated in FIG. 10, a portion constituting the wall portion at the left end of the protruding portion 40R2 is removed, and two slits LT vertically penetrating through the guide plate 40 and extending in the left-right direction are provided in parallel with each other in the vicinity of both ends in the front-rear direction of the portion constituting the bottom surface of the protruding portion 40R2. Such a guide plate 40 can be used together with the base portion 10 having the connector CN illustrated in FIG. 9 (FIG. 11). In this case, by lifting the left end of the upper portion of the protruding portion 40R2 (hereinafter, referred to as a cover portion CV) to bend and turn up the cover portion CV, the connector CN can be brought into an exposed state (a state such that the connector CN can be visually recognized and touched from above), and the wiring can be easily attached to and detached from the connector CN in this state.

In the present invention and the present specification, in a case where the guide plate 40 has a region having a thickness larger than a thickness of the region with the slope being formed, the region is referred to as a "thick plate region", and the region with the slope being formed is referred to as a "thin plate region".

Second Embodiment

Next, a load detector 200 of the second embodiment will be described. The load detector 200 of the second embodiment is the same as a load detector 100 of the first embodiment except that a placement unit 230 is provided with a discharge port OL. Here, a description of the same structure as the load detector 100 of the first embodiment will be omitted.

When a load detector is disposed under a leg of a bed to detect a load of a subject on the bed, a liquid such as water may enter a weighing pan of the load detector. Such an event may be caused, for example, by water condensing on the leg of the bed and flowing into the weighing pan or by liquid being accidentally spilled near the load detector. The liquid on the weighing pan has weight, becoming an error factor affecting the detection result. It is also unhygienic.

The placement unit 230 of the load detector 200 of the second embodiment is a flat plate having a substantially rectangular shape in a plan view, and includes four corners rounded in an arc shape, similarly to the placement unit 30 of the first embodiment. The placement plate 230 is formed of, for example, an aluminum die-cast material (ADC12).

Figure 12:
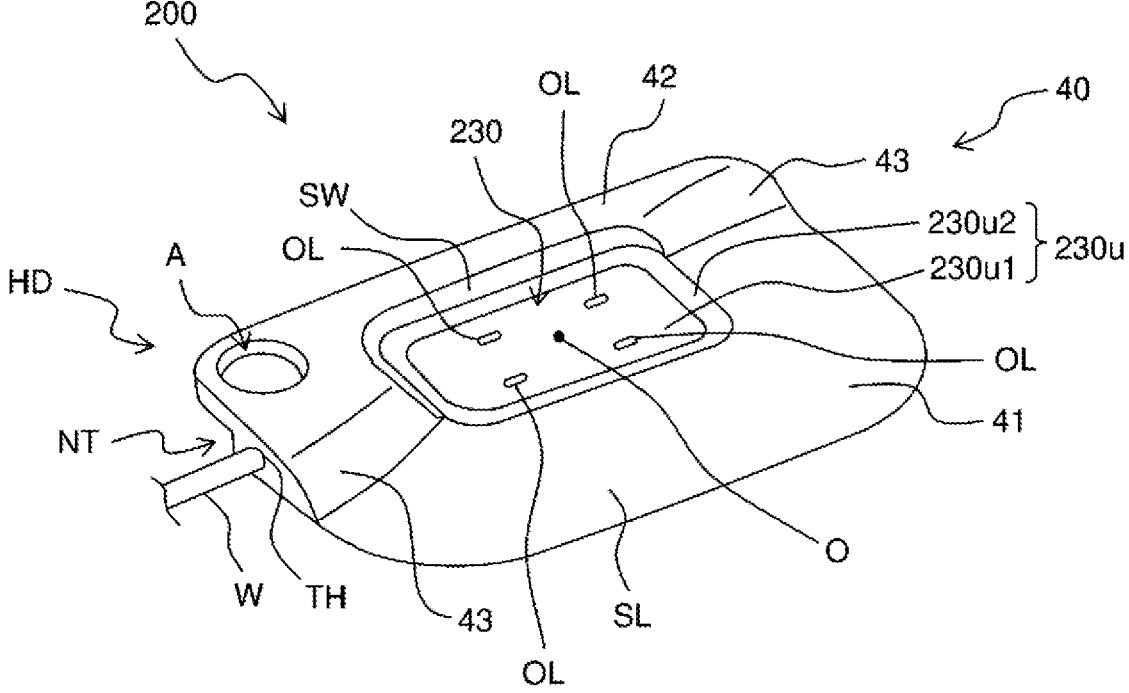
FIG. 12 is a perspective view of a load detection device according to a second embodiment of the present invention.

An upper surface 230*u* (FIG. 12) of the placement unit 230 includes a central region 230*u*1 and a peripheral region 230*u*2 provided around the central region 230*u*1. The central region 230*u*1 is a flat surface having a substantially rectangular shape in a plan view. The peripheral region 230*u*2 has a hollow square shape (O-shape) in a plan view, and is an inclined surface rising as the distance from the center O increases.

Four discharge ports OL are provided in the central region 230*u*1. Each of the four discharge ports OL penetrates through the placement unit 230 on a flat plate in the up-down direction, and is configured to discharge the liquid at the upper surface 230*u* to the lower side of the placement unit 230.

The four discharge ports OL are disposed at the right side and the left side of the center O, two at each side, with a gap in the front-rear direction. Each of the four discharge ports has an oval shape elongated in the width direction.

In the load detector 200 according to the second embodiment, when the liquid enters the upper surface 230*u* of the placement unit 230, the liquid is discharged onto the floor surface where the load detector 200 is installed via the discharge port OL and the opening $OP_{10}$ of the base portion 10. Therefore, it is possible to suppress the occurrence of an error in the detection result of the load detector 200 due to the retention of the liquid in the placement unit 230. Further, the load detector 200 can be kept in a sanitary state. In a case where the load of the subject on the bed is detected by using the load detector to perform the present-on-bed determination or the acquisition of the biological information (the respiration rate, the heart rate, or the like), the load detector is required to be highly accurate and hygienic, and thus it is particularly preferable that these advantages are exhibited.

The number, shape, and arrangement of the discharge ports OL may be appropriately set so that the liquid in the placement unit 230 is favorably discharged to the lower side. When it is expected that a caster CT be installed at the center O, the discharge port OL may be provided at a position slightly away from the center O so that the discharge port OL is not blocked by the caster CT.

The placement unit 230 having the discharge port OL may be used as a weighing pan of any load detector for a bed hot having the guide plate 40. Specifically, for example, a configuration can be adopted such that the placement unit 230 is attached as a weighing pan to the support base and a free end of a beam type load cell being cantilevered by the support base and having the free end.

Third Embodiment

The load detection system of the third embodiment includes a plurality of load detection devices 100 (or load detection devices of the modified example) and a control unit (not illustrated) connected to the plurality of load detection devices 100. In this case, the control unit may acquire the load of the subject on the bed BD based on the outputs from the plurality of load detection devices 100. In this load detection system, the load detection device and the control unit may be connected to each other via the wiring W or wirelessly. The load detector 200 of the second embodiment may be used instead of the load detector 100.

As long as the features of the present invention are maintained, the present invention is not limited to the embodiments described above, and other forms considered within the scope of the technical concept of the present invention are also included within the scope of the present invention.

REFERENCE SIGNS LIST

10 Base portion, 20 Strain sensor unit, 30, 230 Placement unit, 40 Guide plate, 100, 200 Load detection device, SL Slope, HD Handle

The invention claimed is:

1. A load detection device installed under a caster of a bed, the load detection device comprising:
   a placement unit, the caster being placed on the placement unit;
   a load detection unit configured to detect a load applied to the placement unit; and
   a guide plate having an annular shape and surrounding the placement unit, wherein
   the guide plate is provided with a slope configured to guide the caster to the placement unit and a handle for moving the load detection device, and the slope includes a first slope provided adjacent to the placement unit in a predetermined direction, and a second slope provided adjacent to the placement unit in a direction orthogonal to the predetermined direction.

2. The load detection device according to claim 1, wherein the guide plate having an annular shape includes a thin plate region and a thick plate region along a circumferential direction, the thick plate region having a thickness larger than a thickness of the thin plate region, and
   the slope is provided in the thin plate region, and the handle is provided in the thick plate region.

3. The load detection device according to claim 2, wherein an inner peripheral surface of the thick plate region of the guide plate defines a stop wall configured to restrict movement of the caster away from the placement unit.

4. The load detection device according to claim 3, wherein the stop wall is provided at a side of the placement unit opposite to the first slope in the predetermined direction and at a side of the placement unit opposite to the second slope in the direction orthogonal to the predetermined direction.

5. The load detection device according to claim 2, wherein an inclined surface rising from an upper surface of the thin plate region toward an upper surface of the thick plate region is provided between the thin plate region and the thick plate region.

6. The load detection device according to claim 2, wherein the guide plate has a substantially rectangular outer periphery, and
   the handle includes a notch provided at a lower surface of the guide plate at a corner portion of the substantially rectangular outer periphery and in the thick plate region, and a through hole extending between an upper surface of the guide plate and the notch.

7. The load detection device according to claim 1, wherein in the guide plate, a width in the predetermined direction of the first slope is larger than a width in the predetermined direction of a region located at a side opposite to the first slope across the placement unit.

8. The load detection device according to claim 1, further comprising a connector for transmitting an output from the load detection unit to the outside, wiring being detachably connected to the connector, wherein
   a slit is provided in a region of the guide plate above the connector, and
   the connector is exposed by lifting a region adjacent to the slit at an upper surface of the guide plate.

9. The load detection device according to claim 1, wherein the placement unit is provided with a discharge port configured to discharge liquid at an upper surface of the placement unit to a lower side of the placement unit.

10. A load detection system configured to detect a load of a subject on a bed, the load detection system comprising:
    a plurality of load detection devices; and
    a control unit connected to the plurality of load detection devices, the control unit being configured to acquire the load of the subject based on outputs of the plurality of load detection devices, wherein
    each of the plurality of load detection devices is the load detection device according to claim 1.

\* \* \* \* \*